United States Patent
Chen (10) Patent No.: US 8,016,558 B2
(45) Date of Patent: Sep. 13, 2011

(54) DIFFUSIVE COOLING DEVICE

(75) Inventor: Chen-Wei Chen, Chung-Ho (TW)

(73) Assignee: Cooler Master Co., Ltd., Taipei (TW)

( * ) Notice: Subject to any disclaimer, the term of this patent is extended or adjusted under 35 U.S.C. 154(b) by 1076 days.

(21) Appl. No.: 11/832,691

(22) Filed: Aug. 2, 2007

(65) Prior Publication Data

US 2009/0004001 A1 Jan. 1, 2009

(30) Foreign Application Priority Data

Jun. 29, 2007 (TW) .............................. 96210705 U (51) Int. Cl.
*F04D 29/40* (2006.01)
(52) U.S. Cl. ................... 415/214.1; 415/224.5; 361/695
(58) Field of Classification Search .................. 415/116, 415/211.2, 214.1, 224, 213.1, 207, 224.5; 416/97 A, 93 R; 361/688, 689, 690, 695, 361/694

See application file for complete search history.

(56) References Cited

U.S. PATENT DOCUMENTS

| 6,111,748 A * | 8/2000 | Bhatia ........................... 361/695 |
| 2006/0280601 A1 * | 12/2006 | Wu et al. ..................... 415/198.1 |

\* cited by examiner

*Primary Examiner* — Edward Look
*Assistant Examiner* — Dwayne J White
(74) *Attorney, Agent, or Firm* — Chun-Ming Shih; HDLS IPR Services (57) ABSTRACT

A diffusive cooling device includes a plate body, on which a cavity recessed outwardly is formed and an opening is arranged; a web plate jointed at the upper side of the plate body correspondingly; a plurality of passing openings arranged on the web plate to act as air passages; a scroll fan arranged between the plate body and the web plate in corresponding to the opening; a shell body connected to the bottom of the plate body and jointed to the web plate correspondingly to enclose and prop up the plate body therein; and, an air inlet arranged at the front side of the shell body, through which an ambient air is flowed into the shell body by the extracting and thrusting forces of the fan. During operation, airflow is generated along the cavity and extended to corresponding area of web plate to diffusively pass through the plural passing openings to achieve a cooling objective.

11 Claims, 10 Drawing Sheets

DIFFUSIVE COOLING DEVICE

BACKGROUND OF THE INVENTION

1. Field of the Invention

The present invention generally relates to a cooling device, in particular, to a cooling device attached to a bottom of an electronic device.

2. Description of Prior Art

Cooling performance always plays a key role in influencing the development of current electronic technology. Following the progress of technology and material, current electronic devices not only have more and more enhanced functions inherently, but also generate higher and higher heat dissipation during operation, the later eventually influencing the normally working temperature of the electronic device and thus reducing its lifespan, so appropriate cooling device has become an indispensable component in current electronic device's designing field.

Nowadays, a cooling mechanism is always designed correspondingly in most electronic components disposed inside electronic products seen in current market for operating a cooling function to keep each electronic component working under normal temperature. However, the designing trend of current electronic product is toward minimization, for example, notebook computer, which can not have a large volume of shell body as that of a common desktop computer to simultaneously accommodate multiple sets of heat dissipating accessories, so that most minimized electronic devices (e.g., notebook computer) have to install additional cooling devices to fulfill respectively required cooling demand.

According to an initial design of prior art, a cooling plate is attached to a bottom of a notebook computer to act as an auxiliary cooling device. The cooling plate, constructed of materials characterized with high heat conductivity, is directly and tightly attached to the bottom of the notebook computer in a way, such that the cooling plate may absorb the heat generated from the notebook computer via its high heat conductivity. Then, the absorbed heat is spread across the cooling plate and dissipated to the ambience via a heat exchanging operation, thus an auxiliary heat dissipating effectiveness being able to achieve. However, since the cooling efficiency of the heat conducting operation can not keep up with the heat generated from the interior of the notebook computer, the cooling performance of the prior cooling plate is unsatisfactory to both manufacturer and customer.

Accordingly, in order to solve the insufficiently heat dissipating problem of the prior structure, a fan is thereby arranged at the bottom of the cooling plate to generate a forced airflow aiming to a location, where heat is most easily generated from the notebook computer. However, according to this fixed position designing mode, the fan is usually arranged at one single position on the cooling plate, where the fan airflow can only perform a heat dissipating operation in terms of a forced air cooling mechanism to only one single position, so that impossibility of performing a heat dissipating operation in terms of a forced air cooling mechanism to the entire area of the bottom part of a notebook computer becomes a defect to such kind of cooling device, otherwise it will be perfect.

SUMMARY OF THE INVENTION

The invention is to provide a diffusive cooling device capable of diffusively applying a forced airflow, which is generated from a single scroll fan through the application of a plate body arranged with a cavity structure, making the airflow's cooling operation extend to all heating positions corresponding to the electronic device needed to be cooled, such that it may provide a sufficiently cooling effectiveness.

The invention is mainly to provide a diffusive cooling device including a plate body, on which a cavity recessed outwardly is formed and an opening is arranged; a web plate jointed at the upper side of the plate body correspondingly; a plurality of passing openings arranged on the web plate to act as air passages; a scroll fan arranged between the plate body and the web plate in corresponding to the opening; a shell body connected to the bottom of the plate body and jointed to the web plate correspondingly to enclose and prop up the plate body therein; and, an air inlet arranged at the front side of the shell body, through which ambient air is flowed into the shell body by the extracting and thrusting forces of the fan. During operation, airflow is generated along the cavity and extended to corresponding area of web plate to diffusively pass through the plural passing openings to achieve a cooling objective.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to several preferable embodiments, being not used to limit its executing scope. Any equivalent variation and modification made according to appended claims is all covered by the claims claimed by the present invention.

Figure 1:
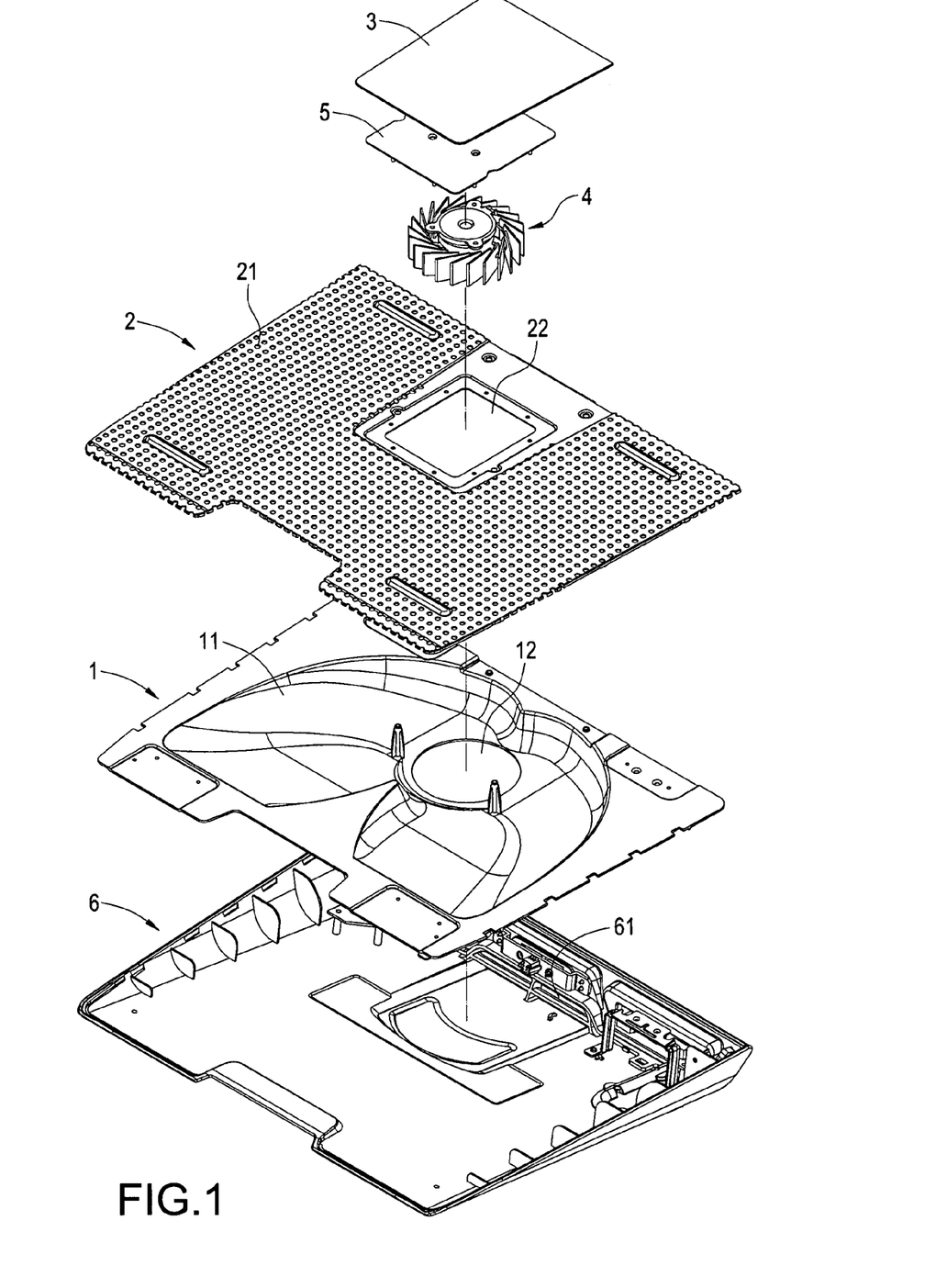
FIG. 1 is a perspective view explosively showing the structure of the present invention.
Figure 2:
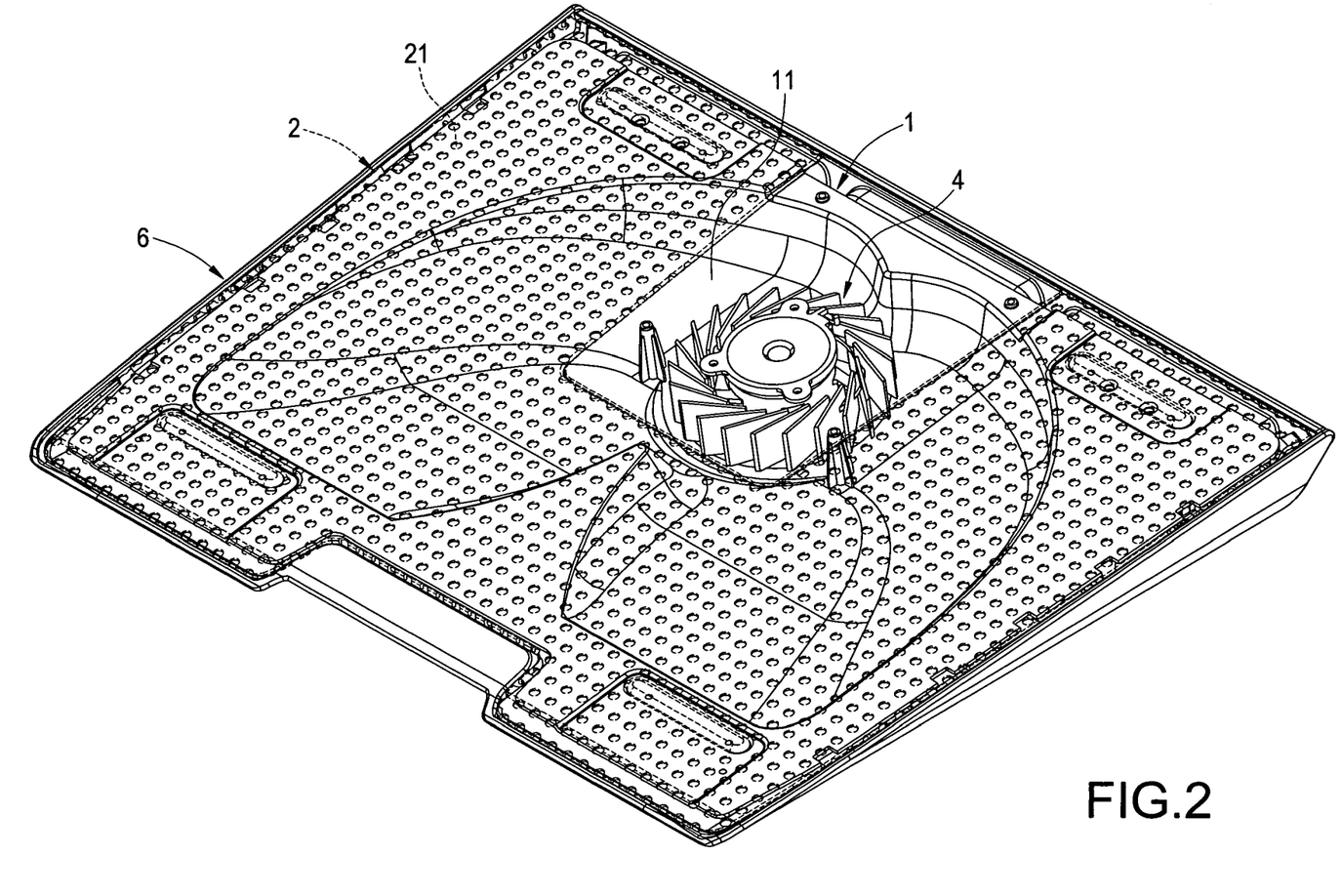
FIG. 2 is a perspective view explosively showing the partially cross-sectional structure of the present invention.
Figure 3:
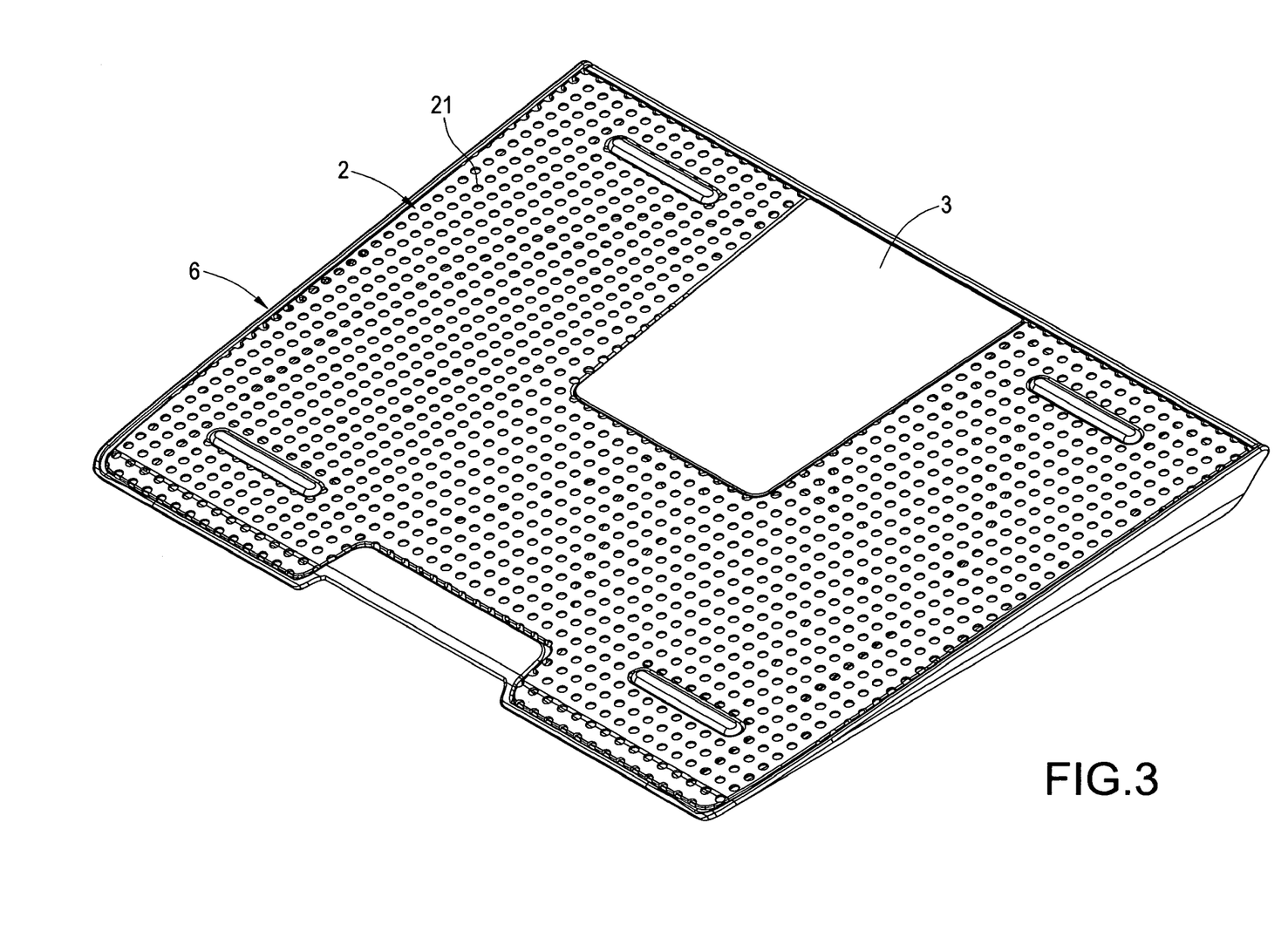
FIG. 3 is a completely assembled view of an outer appearance of the present invention.

Please refer to FIG. 1, which is a perspective view explosively showing the structure of the present invention. As shown in this figure, a cooling device according to the invention includes a plate body 1, a bottom of which is extended outwardly to be formed as a bowl-shaped cavity 11. In this case, the circumference of the cavity 11 is shown as an arc shape. In addition, the bottom of the plate body 1 is arranged an opening 12 penetrating through the bottom of the plate body 1. Furthermore, the upper side of the plate body 1 is correspondingly jointed a web plate 2, which is applied for supporting an electronic device, for example, notebook computer. The circumferential profile of the web plate 2 is same as that of the plate body 1. A plurality of passing openings 21 functioned as air passages are arranged on the web plate 2 and are shown as circular holes' configuration in this embodiment. A rectangular through opening 22 is arranged on the web plate 2 at a position corresponding to the opening 12 of the plate body 1. A top lid 3 is arranged over the through opening 22 for closing it. Again, a fan 4 is arranged between the opening 12 and the through opening 22, as shown in FIG. 2. In this case, the fan 4 is a scroll fan, on top of which a fixing plate 5 is arranged for fixing a position of the fan 4. Finally, a hollow shell body 6 is slantwise arranged under the plate body 1 for accommodating the cavity 11 projected from the plate body 1. The shell body 6 is correspondingly jointed to the web plate 2 to enclose the plate body 1 therein. Furthermore, an air inlet 61 is arranged on the front face of the shell body 6 to act as an entrance of an ambient air, as shown in the cross-sectional view of FIG. 4. The completely assembled view is shown in FIG. 3.

Figure 4:
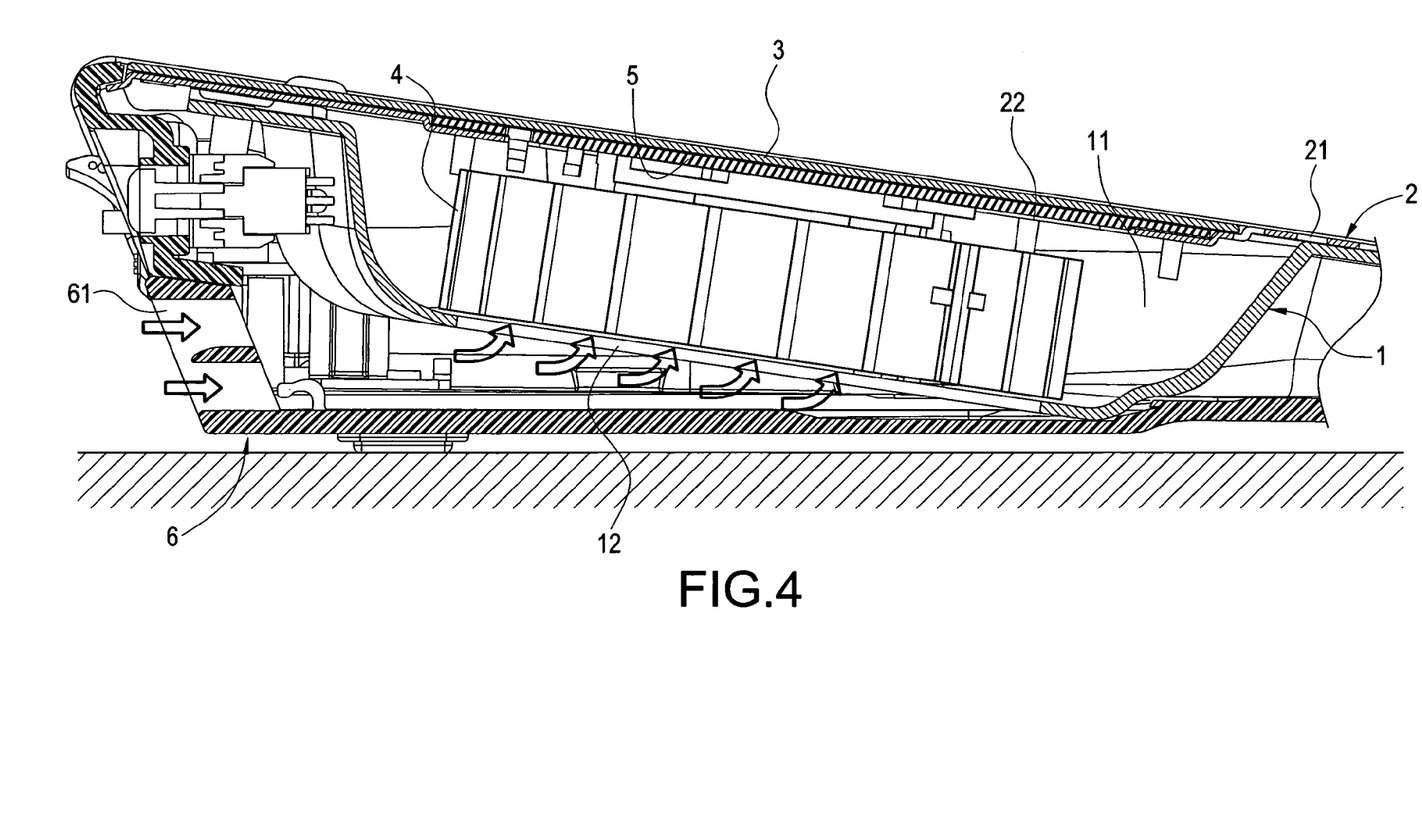
FIG. 4 is an operationally cross-sectional view of the present invention.
Figure 5:
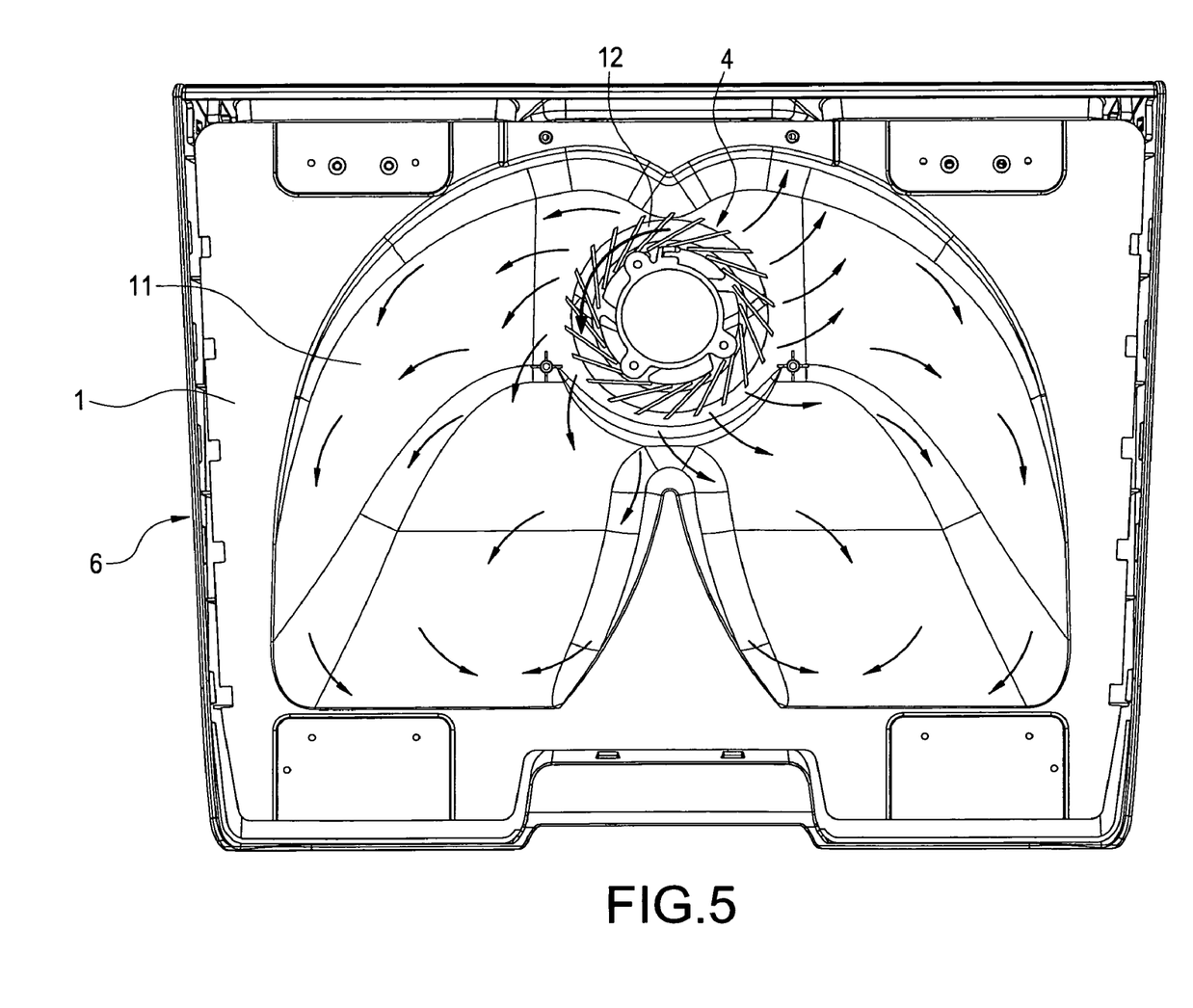
FIG. 5 is an operationally top view of the present invention.
Figure 6:
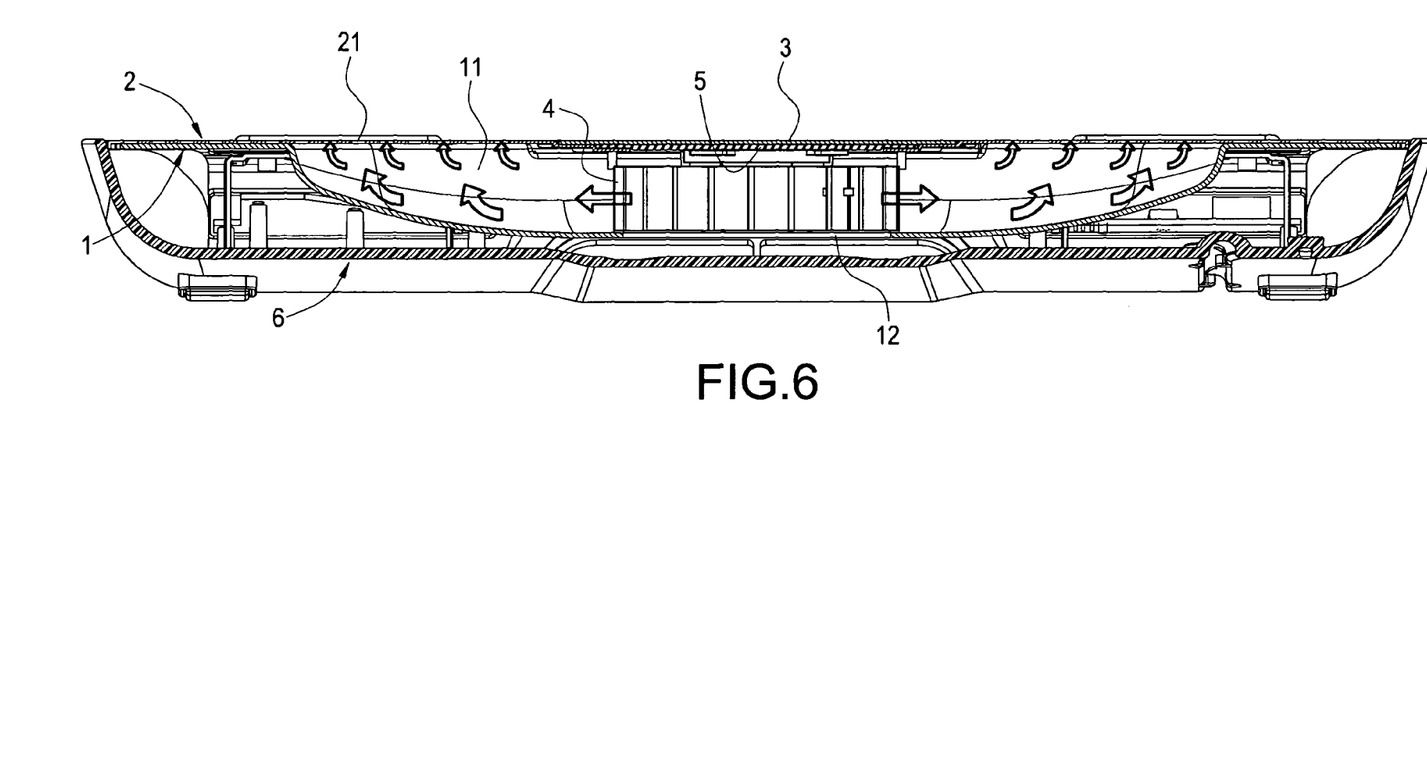
FIG. 6 is an operationally front view of the present invention.

Please refer to FIG. 4 and FIG. 5, which respectively are an operationally cross-sectional view and an operationally top view of the invention. As shown in these figures, after the fan 4 arranged in the cooling device starting an operation, a forced circulation generated by the starting operation of the fan 4 extracts cooling airs into the shell body 6 from the ambience via an air inlet 61 at front face of the shell body 6, as shown by the arrows. The cooling airflow is further extracted and thrust by the fan 4 to enter the cavity 11 formed in the plate body 1. Through the bowl-shaped structure of the cavity 11, the airflow is diffused outwardly along the curved surfaces of the cavity 11, as shown by the arrows of FIG. 5, making the cooling air from the ambience fill the entire interior of the cavity 11. Finally, the diffused airflows penetrate through the plural passing openings 21 arranged on the web plate 2 jointed correspondingly to the plate body 1, as shown by the arrows of FIG. 6. The airflows penetrating through the passing openings 21 make heat exchanging operation with the electronic device (not shown in the figure) attached on the web plate 2 to carry away the heat generated by the electronic device, and thus the electronic device may be kept under a normally working temperature.

Figure 7:
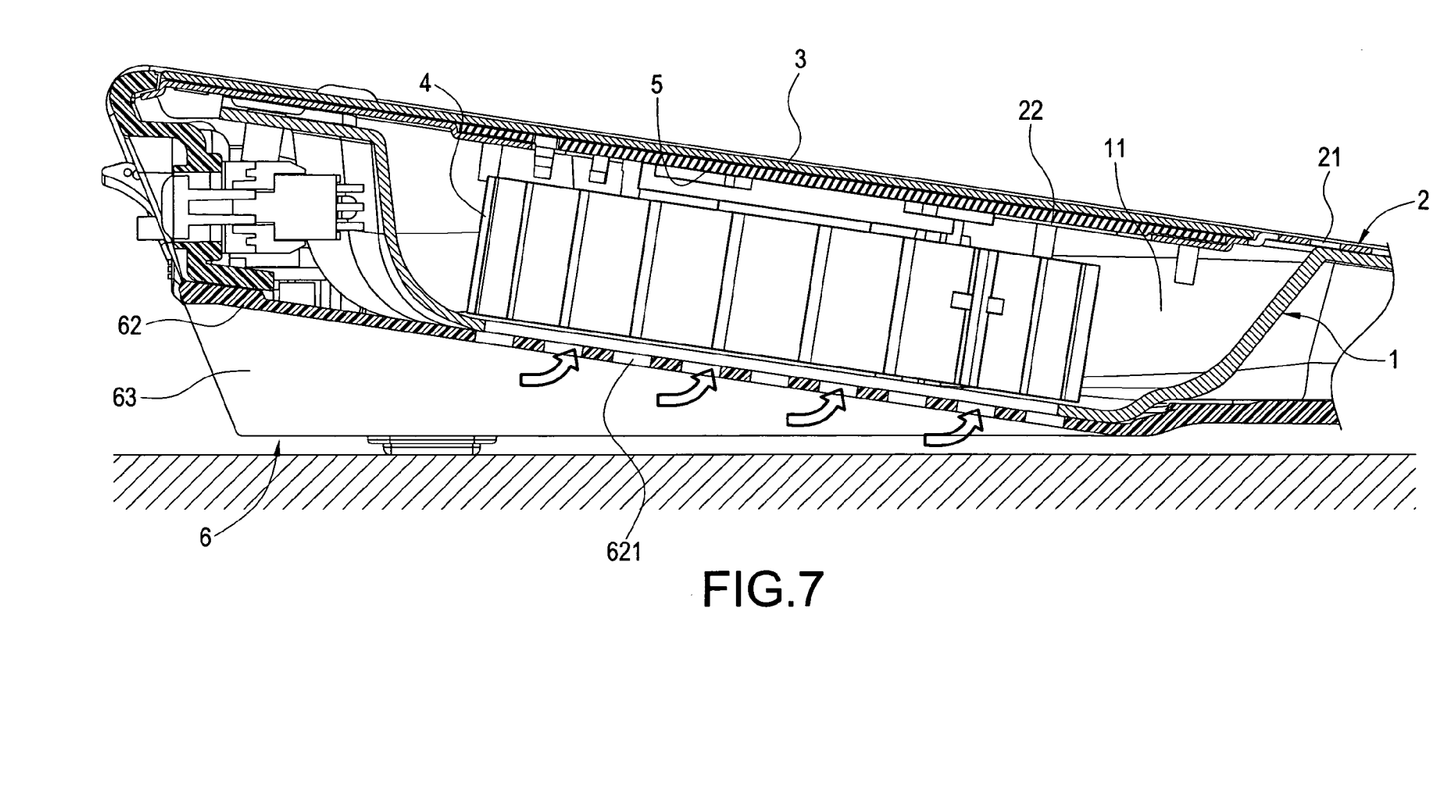
FIG. 7 is a structurally cross-sectional view of a shell body according to another embodiment of the present invention.
Figure 8:
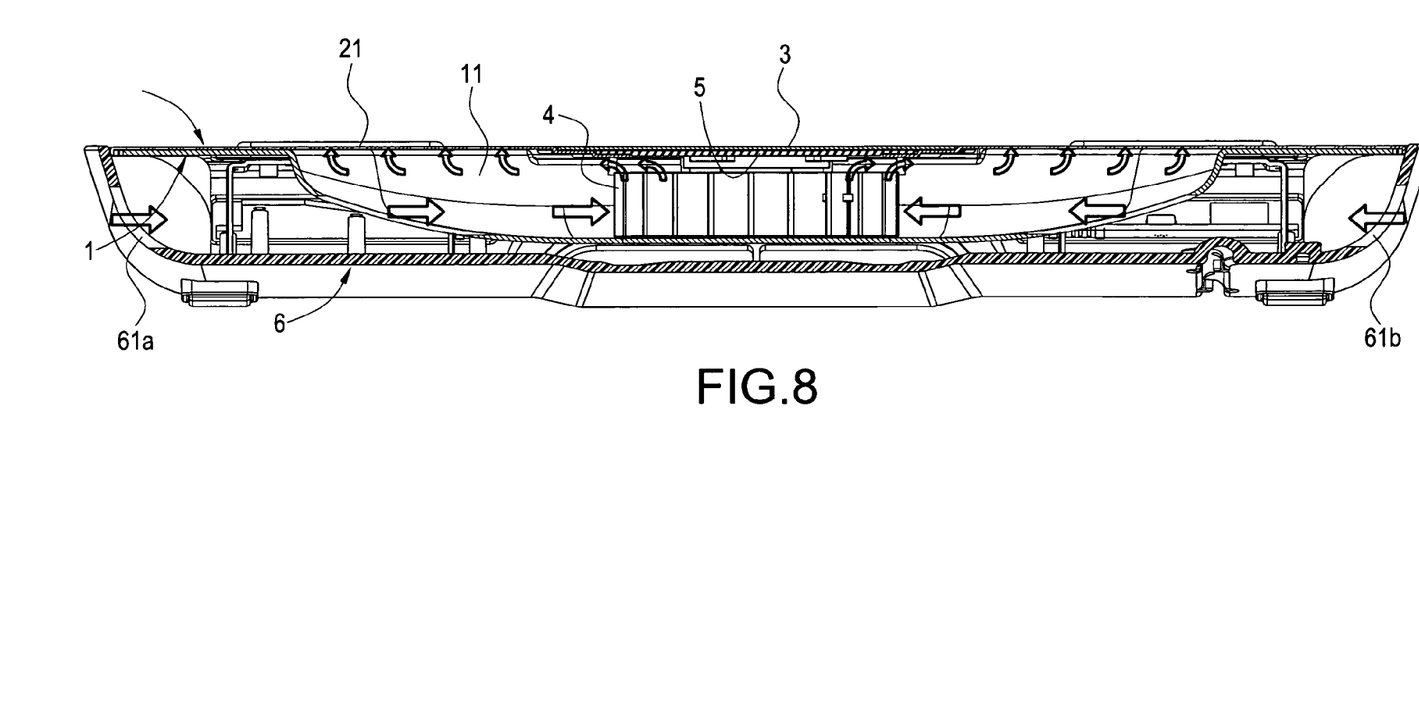
FIG. 8 is a structurally cross-sectional view of a shell body according to a further embodiment of the present invention.

Please refer to FIG. 7, which is a structurally cross-sectional view of a shell body according to another embodiment of the invention. As shown in this figure, the shell body 6 is a slant configuration viewed from the side thereof. A slantwise supporting plate 62 is designed in the interior of the shell body 6 for being inter-jointed to the bottom of the plate body 1. In this case, a plurality of passing holes 621 are arranged on the supporting plate 62 at a position corresponding to the opening 12 arranged at the bottom of the plate body 1 to act as air inlets of the fan 4. In addition, an accommodating space 63 is formed between the supporting plate 62 and the bottom of the shell body 6 to let the ambient air enter the accommodating space 63 via an open front side of the shell body 6 and further enter the cavity 11 of the plate body 1 via the passing holes 621 of the supporting plate 62 by means of the rotating operation of the fan 4. After being diffused to the entire cavity 11, the cooling air penetrates through a plurality of passing openings 21 arranged on the web plate 2 connected to the top of the cavity 11 to process a cooling operation. In addition, as shown in FIG. 8, except at the front side of the shell body 6, the air inlet may be arranged at two sides of the shell body 6, for example, the air inlets 61a and 61b, to increase the air inletting flow rate of the shell body 6.

Figure 9:
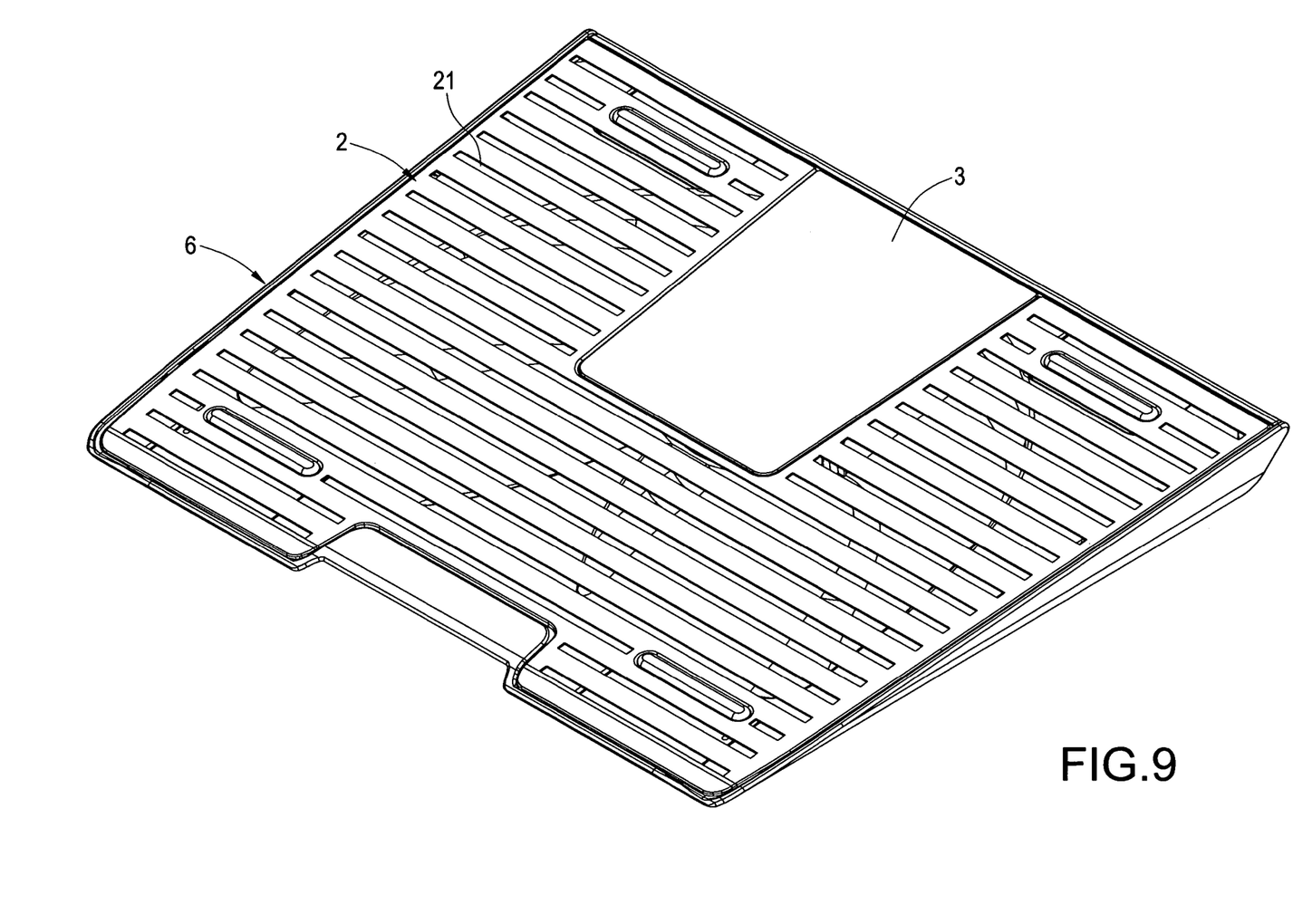
FIG. 9 is a top view of a web plate according to another embodiment of the present invention.

Please refer to FIG. 9, which is a top view of the web plate according to another embodiment of the invention. Except as a configuration of circular holes, as described thereinbefore, the passing openings 21 of the web plate 2 may also be designed as rectangular slots interspaced on the web plate 2 for facilitating the air in the cavity 11 in penetrating through the passing openings 21, as shown in this figure.

Figure 10:
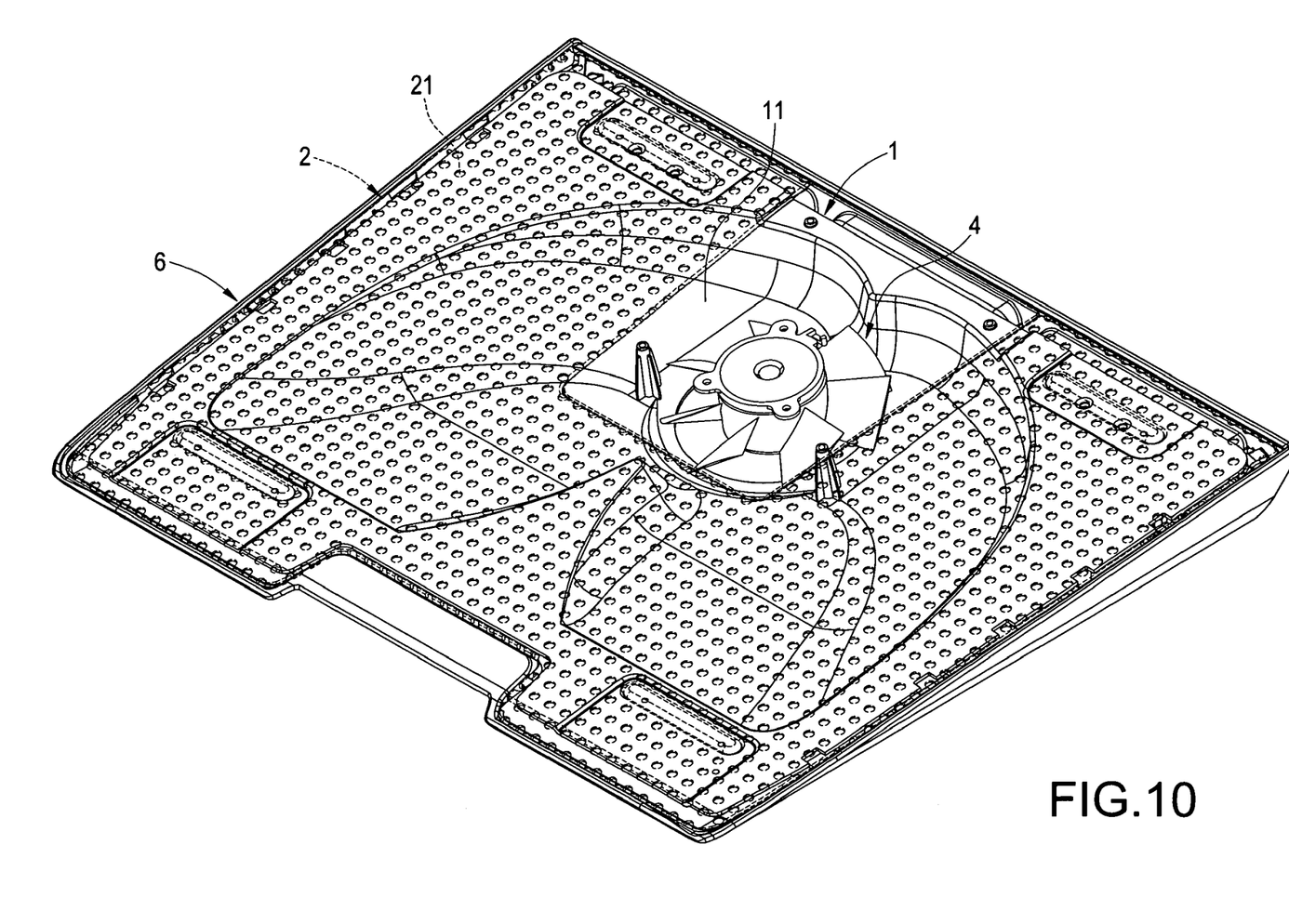
FIG. 10 is a structurally perspective view of a fan according to another embodiment of the present invention.

Please refer to FIG. 10, which is a structurally perspective view of a fan according to another embodiment of the invention. Except a scroll fan, as described thereinbefore, the configuration of the fan 4 may also be an ordinary DC fan. Blocked by a top lid 3, a forced airflow generated from the fan 3 is diffused along the curved surface of the cavity 1 to thereby achieve a same cooling effectiveness.

However, the aforementioned description is only a preferable embodiment according to the present invention, being not used to limit the patent scope of the invention, so equivalently structural variation made to the contents of the present invention, for example, description and drawings, is all covered by the claims claimed thereinafter.

What is claimed is:

1. A diffusive cooling device, comprising:
   a plate body, on which a cavity recessed outwardly is formed, at a bottom of which an opening is arranged through the plate body;
   a web plate, which is jointed to the plate body, and on a plate face of which a plurality of passing openings are arranged to act as air passages;
   a scroll fan, which is arranged between the plate body and the web plate in corresponding to the openings of the plate body and the web plate for extracting an airflow from the openings;
   a shell body, which is connected to the plate body and the web plate, and which is jointed to the web plate correspondingly to enclose the plate body therein; and
   a supporting plate, which is arranged in the shell body for supporting the shell body.

2. The diffusive cooling device according to claim 1, wherein an air inlet is arranged at a front side of the shell body, through which ambient air is flowed into the shell body.

3. The diffusive cooling device according to claim 1, wherein two sides of the shell body are respectively arranged an air inlet, through which ambient air is flowed into the shell body.

4. The diffusive cooling device according to claim 1, wherein an accommodating space is formed between the supporting plate and a bottom of the shell body to act as air passages.

5. The diffusive cooling device according to claim 1, wherein a plurality of passing holes are arranged on the supporting plate in corresponding to the opening of the plate body to act as air passages.

6. The diffusive cooling device according to claim 1, wherein the cavity is configured as a bowl shape.

7. The diffusive cooling device according to claim 1, wherein a through opening is arranged on the web plate in corresponding to the opening of the plate body.

8. The diffusive cooling device according to claim 1, wherein the passing opening is configured as a circular hole.

9. A diffusive cooling device, comprising:
   a plate body, on which a cavity recessed outwardly is formed, at a bottom of which an opening is arranged through the plate body;
   a web plate, which is jointed to the plate body, and on a plate face of which a plurality of passing openings are arranged to act as air passages;

a scroll fan, which is arranged between the plate body and the web plate in corresponding to the openings of the plate body and the web plate for extracting an airflow from the openings; and a through opening, which is arranged on the web plate in corresponding to the opening of the plate body, wherein the through opening is further connected a top lid for closing the through opening.

10. A diffusive cooling device, comprising:

a plate body, on which a cavity recessed outwardly is formed, at a bottom of which an opening is arranged through the plate body;

a web plate, which is jointed to the plate body, and on a plate face of which a plurality of passing openings are arranged to act as air passages; and a scroll fan, which is arranged between the plate body and the web plate in corresponding to the openings of the plate body and the web plate for extracting an airflow from the openings;

wherein the passing openings are respectively configured as a rectangular shape and interspaced to each other.

11. A diffusive cooling device, comprising:

a plate body, on which a cavity recessed outwardly is formed, at a bottom of which an opening is arranged through the plate body;

a web plate, which is jointed to the plate body, and on a plate face of which a plurality of passing openings are arranged to act as air passages;

a scroll fan, which is arranged between the plate body and the web plate in corresponding to the openings of the plate body and the web plate for extracting an airflow from the openings; and a fixing plate, which is arranged at a top side of the fan for fixing the fan to a position.

* * * * *